Oct. 1, 1940.  A. B. FOGLE  2,216,663
STORAGE BATTERY BOX CLAMP
Filed Nov. 3, 1939
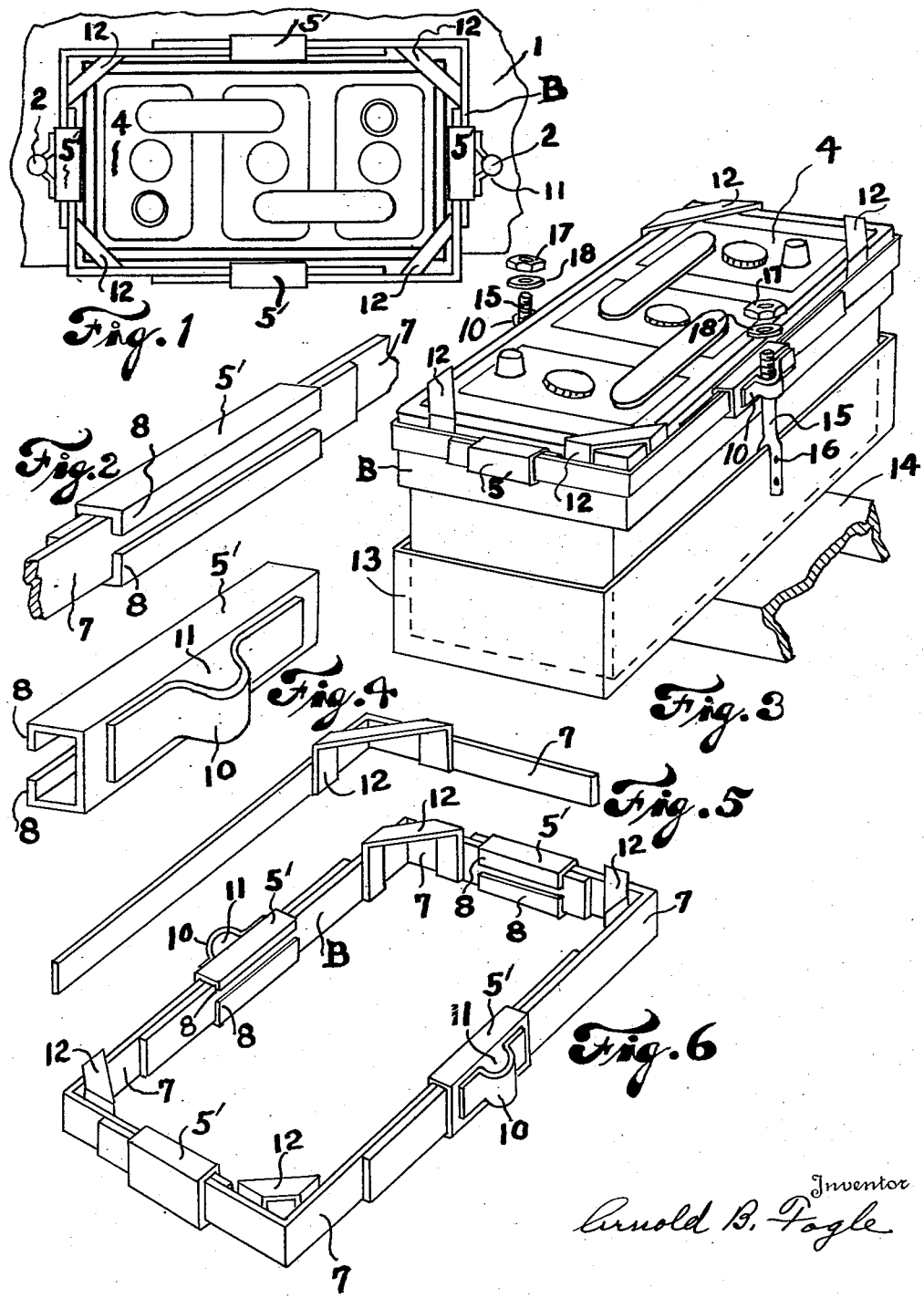
Inventor
Arnold B. Fogle Patented Oct. 1, 1940

2,216,663

UNITED STATES PATENT OFFICE 2,216,663

STORAGE BATTERY BOX CLAMP

Arnold B. Fogle, Shelbyville, Ind.

Application November 3, 1939, Serial No. 302,789

5 Claims. (Cl. 180—68.5)

This invention relates to an improvement in a storage battery box clamp, which engages the top edges and top sides of the box for holding it in place on the automobile. Many different kinds of clamping means for holding the battery and bolting it in position have been used in the past and are now in common use, but such devices of this nature with which I am familiar have proven deficient in many respects and therefore the important features of the instant invention are the adjustable features of its frame construction for changing its dimensions and the adjustable features of adjusting its means for bolting the frame in its proper place.

It is an important object of this invention to provide an adjustable battery box clamp that can be used on different sizes of battery boxes and models and makes of automobiles and by its adjustable features obtain a more uniform fit to the box. Many different size boxes are used and manufactured and also different automobile manufacturers use different locations of their means for bolting the battery in place and different locations of the bolts used to bolt the clamp over the battery. My invention eliminates the necessity of manufacturing a different sized clamp for each size battery and different type clamps for different models and makes of automobiles.

Further objects and advantages of the invention and details of construction and methods of operation will be more fully set forth in the detailed description to follow.

Referring to the accompanying drawing wherein is illustrated one embodiment of the invention:

Fig. 1 is a top view of a portion of the dash of an automobile, namely, the Ford, and which is now in use. It shows the battery holder for carrying the battery pressed and formed in the outer face of the dash with part of the dash formed in a horizontal surface, forming a surface and means for bolting the clamping frame over the battery and holding the battery in its natural vertical position.

Fig. 2 is an enlarged perspective view of a portion of the improved adjustable clamp and shows how its angle sections are made adjustable and held together by the open tube shaped clamp around the adjoining parts of the angle sections.

Fig. 3 is a perspective view of a conventional battery carrier with anchor bolts, battery therein, and my improved adjustable holder operatively positioned with the anchoring sleeve structure located on the sides instead of the ends as in Fig. 1, and engaging the carrier anchor bolts.

Fig. 4 is an enlarged perspective view of one of the clamp tubes having formed on its outer face a loop, which is a part of the clamp tube. This loop forms a passage between the tube and the purpose of this is for bolting the battery clamp down in position over the battery.

Fig. 5 shows an enlarged perspective view of one of the angle sections of the adjustable battery clamp and shows formed across its corner the conventional cleat for holding the battery in place.

Fig. 6 shows the complete adjustable and improved clamp, assembled, having its clamp tubes assembled at the ends and sides of the frame for holding the angle sections together. It also shows the clamp tubes having the loops formed on their outer face for bolting the complete assembly in place. Flanges on the clamp tubes are formed in such a manner as to permit the angle sections to slide and the clamp tube to slide over the angle sections. When the desired size of the adjustable frame is obtained these flanges can be compressed against the sides of the angle sections to such an extent that the adjoining sections will stay secure and permanent against vibrations such as might be encountered in usage, thus making a permanent size of the adjustable battery clamp.

In the drawing, referring to Fig. 6, I have shown the adjustable battery clamp assembled and as a unit, and in the following description it will be referred to as B, when shown assembled.

The following will be a description of the parts that constitute the adjustable frame B. Fig. 5 shows one of the angle sections 7, of frame B, and formed across its corner is a conventional cleat 12 for holding the battery in position. In Fig. 2 is an enlarged view of clamp tube 5. It consists of a tube having vertical and horizontal sides with one side left open and apart, forming downward flange 9 and upward flange 8. These clamp tubes or sleeves are formed in such a loose manner as to permit them to slide easily over the adjoining parts of angle sections 7, also permitting angle sections 7 to slide in either direction within their inner surfaces.

The flanges 8 can be compressed against the sides of angle sections 7 when desired and form a combined and permanent combination of angle sections 7 and clamp tubes 5.

In Fig. 4 I have shown the same clamp tube enlarged as was described above with the exception that on its outer surface side opposite to its flanges 8 is formed a loop 10, this loop forming a part of clamp tube 5. Said loop 10 forms passage 11 and which passage will permit a bolt to pass through it and the purpose of which is to bolt the frame in position when in its assembled position. This clamp tube 5 having the bolt loop 10 forming a part will be referred to as bolt clamp tube 5' as it constitutes the same clamp tube as shown in Fig. 2.

As these parts of the adjustable clamp frame B have been described in detail, referring again to Fig. 6, I will show their uses and advantages as the adjustable battery clamp frame B is shown. It is assembled with its bolt clamp tubes 5' on the long sides of its rectangular shaped frame and the clamp tubes 5 on the short sides of its rectangular frame. These clamp tubes 5 and bolt clamp tubes 5' will allow the angle sections 7 to slide in either direction as described. It is easily seen then that the adjustable clamp B can be adjusted for width or length as desired, by pulling or pushing its angle sections 7 in opposite directions. When the adjusted and desired size is acquired then the adjustable clamp frame B can be locked in size and made permanent as one body by compressing the flanges 8 on all of its clamp tubes 5 and bolt clamp tubes 5' against the sides of the adjoining angle sections 7.

Many different size batteries are now manufactured which require a clamp frame made to fit their given sizes. With the adjustable clamp frame and the adjustable features described it is easily seen that it is adjustable and can be made to fit various sizes of battery boxes. Therefore, one of the objects of this invention, is to eliminate the manufacture of numerous sizes of battery clamp frames.

As these adjustable features have been shown for changing its width and length and locking its adjustable parts, the following will describe its adjustable means for changing its bolting positions. Fig. 1 shows the top portion of the Ford automobile dash of one of the present models and has pressed on the face of the dash a socket to accommodate the battery, its top portion is formed in such a manner as to furnish a flat horizontal surface and shows bolt heads 2 with their body and threaded portions through holes in the dash and nuts on the under side of the dash are threaded and screwed on the threaded portions for holding the clamp frame in place and battery in position. B is the adjustable clamp frame in its natural place. Bolt clamp tubes 5' have bolts 2 running through their passages 11 and the bolt heads 2 hold the frame B in place. 12 are the corner cleats over the corners of battery 4, engaged and bearing downwardly. It will be noted that the bolt clamp tubes 5' have been changed in position from their location as shown in Fig. 6. In Fig. 6 it shows the bolt clamp tubes 5' assembled on the sides of the rectangular shaped frame B, while in Fig. 1 it shows the bolt clamp tubes 5' on the ends of the rectangular shaped clamp frame B.

To change the bolt clamp tubes 5' it is done by, refer to Fig. 6, completely disassembling all parts shown from each other and reassembling. Where clamp tubes 5 were shown, bolt clamp tubes 5' are placed and clamp tubes 5 placed where bolt clamp tubes 5' were shown. Being constructed for changing the means of bolting the clamp frame in position is very much desired due to the fact that so many automobiles are equipped with different design batteries and battery holders and their bolts for bolting the battery clamp frames in some designs are located on the ends of the battery while in other designs they may appear on the sides as noted in Fig. 3. Said Fig. 3 shows a perspective view of a design battery holder very much like the common holder now in use. 14 is a cross frame member of the automobile, 13 a box for holding the battery, 15 bolts with threaded portions fastened by rivets 16. 18 is a washer used with threaded nut 17 when screwed on bolts 15 which hold clamp frame B in position.

The adjustable battery clamp frame B can be used on either design holder as in Fig. 1 where the bolts appear on the ends of the holder or as in Fig. 3 where the bolts appear on the sides.

Changing the means for bolting the battery clamp frame in position is another object of my invention as it eliminates the necessity of manufacturing a design clamp frame for each design battery holder in use on different models and makes of automobiles.

While I have described my invention and shown it in several sections I prefer to manufacture its frame adjustable in as many angle sections and clamp tubes as might be required to meet future changes in design battery holders, also that its bolting means may be used anywhere along the adjustable frame.

I claim as my invention:

1. A holding device for batteries and the like comprising a sectional frame adjustable to conform to batteries of different dimensions, the opposite free ends of the respective sections adapted for overlapping engagement, retaining devices adapted to normally hold said free ends in overlapping and slidable relation, said devices including means for clamping the frame in adjusted position and means connected to the retaining devices and adapted to coact with an anchoring means for securing the frame in battery holding position.

2. A holding device for batteries and the like comprising a frame adjustable to conform to batteries of different dimensions, retaining devices adjustably mounted on opposite sides of said frame, means carried by said retaining devices and adapted for engagement with anchor means carried by the battery support, and additional means for clamping the frame in adjusted position.

3. A holding device for batteries and the like comprising a frame adjustable to conform to batteries of different dimensions, means carried by the frame and coacting with the battery to maintain said frame in battery holding position, and a plurality of sleeve means adjustably mounted on said frame, certain of said sleeve means having anchor engaging means adapted to cooperate with anchor means at different points with respect to said frame, whereby to maintain said battery in fixed position.

4. A holding device for batteries and the like comprising a frame adjustable to conform to batteries of different dimensions, said frame including sections, the free ends of said sections overlying adjoining sides of the battery and in overlapping relation with the oppositely extending ends of the respective adjacent sections, means carried by said sections coacting with said battery to maintain said frame in holding position, and sleeve means adapted to telescopically embrace the overlapping ends of said sections, certain of said sleeves having fastening means adapted to cooperate with anchoring means to maintain the battery in fixed position, said sleeves being adjustable to effect engagement of the fastening means with said anchor means at different points with respect to said frame.

5. A holding device for batteries and the like comprising a frame adjustable to conform to batteries of different dimensions, said frame including sections, the free ends of said sections overlying adjoining sides of the battery and in overlapping relation with the oppositely extending ends of the respective adjacent sections, means carried by said sections coacting with said battery to maintain said frame in holding position, and sleeve means adapted to telescopically embrace the overlapping ends of said sections, certain of said sleeves having fastening means adapted to cooperate with anchoring means to maintain the battery in fixed position, said sleeves being adjustable to effect engagement of the fastening means with said anchor means at different points with respect to said frame, the sleeves having means for clamping the frame in adjusted position.

ARNOLD B. FOGLE.